(12) United States Patent
Krams et al.

(10) Patent No.: US 6,247,549 B1
(45) Date of Patent: Jun. 19, 2001

(54) MOTORCYCLE HAVING A SWIVELLABLE SEAT

(75) Inventors: Peter Krams, Pecetto To.Se-To; Georg Hack, Landshut; Johann Sievers-Paulsen, Freising, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/394,895

(22) Filed: Sep. 13, 1999

(30) Foreign Application Priority Data

Sep. 11, 1998 (DE) .............................................. 198 417 49

(51) Int. Cl.⁷ ...................................................... B62J 1/00
(52) U.S. Cl. ........................................ 180/219; 297/195.1
(58) Field of Search ........................ 180/219; 280/288.4; 297/195.1

(56) References Cited

U.S. PATENT DOCUMENTS

| | | | |
|---|---|---|---|
| 4,413,700 | 11/1983 | Shiratsuchi . | |
| 4,462,634 | * 7/1984 | Hanagan | 297/201 |
| 4,563,038 | 1/1986 | Hirose | 297/243 |
| 4,577,719 | * 3/1986 | Nomura et al. | 180/219 |
| 5,107,949 | * 4/1992 | Gotoh et al. | 180/219 |

FOREIGN PATENT DOCUMENTS

| | | |
|---|---|---|
| 30 26 789 C2 | 1/1989 | (DE) . |
| 43 30 120 C2 | 3/1998 | (DE) . |
| 0 751 062 A2 | 1/1997 | (EP) . |

* cited by examiner

*Primary Examiner*—Kevin Hurley
(74) *Attorney, Agent, or Firm*—Evenson, McKeown, Edwards & Lenahan, P.L.L.C.

(57) ABSTRACT

A motorcycle has a seat arrangement for at least a driver, of which at least one seat bucket forms a seat with a seat cushion mounted on this seat bucket. The seat, which is firmly mounted on the vehicle and can be swiveled up by way of a hinge, can be fixed in the usage position by means of a locking device. The upwardly swivellable seat is fastened on the motorcycle by way of a holding device which also forms the hinge, and the holding device comprises a gas pressure spring which holds the seat in a swiveled-up position.

16 Claims, 5 Drawing Sheets

MOTORCYCLE HAVING A SWIVELLABLE SEAT

BACKGROUND AND SUMMARY OF THE INVENTION

This application claims the priority of German patent document 198 41 749.7, filed Sep. 11, 1998, the disclosure of which is expressly incorporated by reference herein.

The invention relates to a motor cycle having a swivellable seat.

It is known to equip a motorcycle with a seat arrangement which is firmly mounted on the vehicle and can be swiveled up by way of a hinge, and fixed in a usage or riding position by means of a locking device.

German Patent Document DE 30 26 789 C2 describes such a motorcycle, in which, for the purpose of a better accessibility of the engine and the chassis, a seat support with a driver's seat and a fuel tank are each fastened on the motorcycle in an upwardly swivellable manner about a hinge axis which, viewed in the driving direction, is mounted in their forward area. However, this publication does not describe how the seat arrangement is held in the upwardly swiveled position, and does not disclose what other fastening devices, in addition to the hinge, are provided for supporting the seat arrangement.

It is an object of the invention to provide a motorcycle with a seat arrangement, in which at least the seat is constructed so that it can be folded up and, in its folded-up position, is held by the seat arrangement. In addition, in its usage position, the seat must be mounted in a reliable manner, firmly on the vehicle.

These and other objects and advantages are achieved by the motorcycle seat arrangement according to the invention, in which at least one seat bucket forms a seat, which is firmly mounted on the vehicle and can be swiveled up by way of a hinge and can be fixed in a usage position by means of a locking device. According to the invention, the upwards swivellable seat is fastened on the motorcycle by way of a holding device which also forms the hinge. The holding device includes a gas pressure spring which holds the seat in a swiveled-up position. A stop can determine the position into which the seat can be swiveled up.

This arrangement has the advantage that the upwardly swivellable seat can be reliably supported firmly on the vehicle and fixed by way of the holding device. Furthermore, it is supported in the upwardly swiveled position by way of the gas pressure spring, so that it maintains this position.

In an advantageous embodiment of the invention, the seat arrangement is constructed for a driver and a passenger, with the seat for the driver being fastened on the motorcycle so that it can be swiveled upward by way of the hinge. In this case, the seat is swiveled about a hinge axis which, viewed in the driving direction, is mounted essentially in the forward area below the seat on the holding device.

In addition, viewed in driving direction, the locking device is fixedly mounted on the vehicle essentially below the rearward area of the seat.

The upwardly swivellable driver's seat according to the invention has the advantage that it has a very simple construction and can be manufactured at reasonable cost. For this purpose, in a further advantageous embodiment of the invention, it can also be provided with a seat height adjusting element mounted on the seat, which adjusts the distance (in the usage position of the seat) between the seat and an adjusting element support mounted on the rear frame of the motorcycle. Such a height adjusting device has a particularly simple construction and can be manufactured at low cost if, for at least two different seat positions, two different distances can be fixed between the seat and the motorcycle rear frame in the usage position of the seat, and if one holding bow respectively is provided on the seat for each seat position, for the engagement of a locking hook of the locking device.

In a preferred embodiment of the invention, the locking device for the seat is operated by way of an operating device for unlocking, and the locking devices and the operating device are connected with one another by a Bowden cable. This simple embodiment for unlocking the seat has the advantage that the operating device can be mounted on the motorcycle at any easily accessible point.

In a further preferred embodiment of the invention, the operating device is housed in a motorcycle trunk which is fixedly mounted on the vehicle. After opening the motorcycle trunk, the operating device will then be accessible for unlocking the seat.

Other objects, advantages and novel features of the present invention will become apparent from the following detailed description of the invention when considered in conjunction with the accompanying drawings.

DETAILED DESCRIPTION OF THE DRAWINGS

Figure 1:
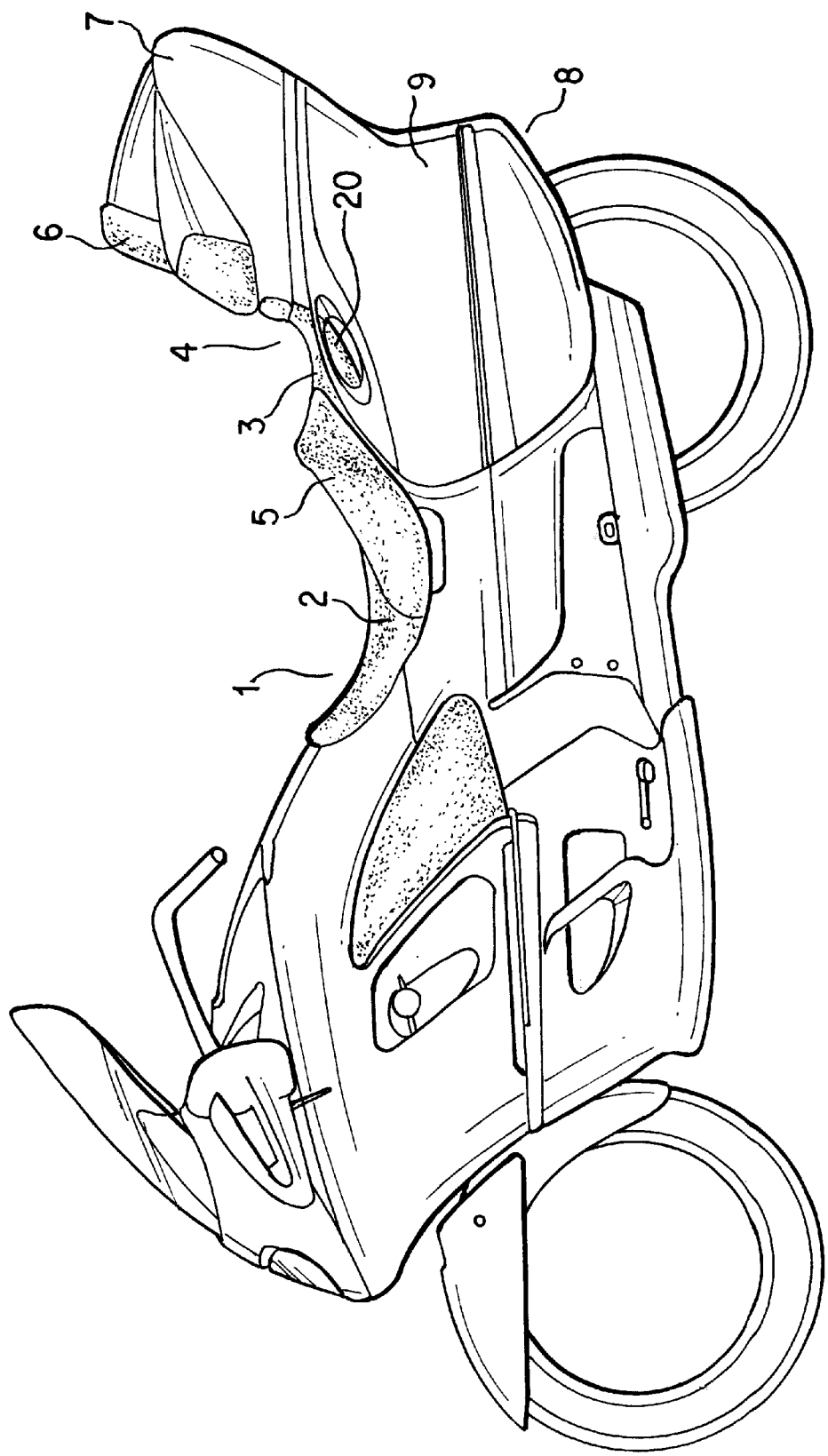
FIG. 1 is a lateral view of a motorcycle having a seat arrangement according to the invention.

FIG. 1 is a lateral view of a motorcycle having a seat arrangement for a driver and a passenger (not shown). Viewed in the driving direction, a driver's seat 1, of which only a seat cushion 2 is visible, is situated in front of the passenger's seat 4, which is also illustrated only by the seat cushion 3. The driver's seat 1 forms a seat bucket together with the cushion layer 5 which is arranged behind the driver's seat 1 as a backrest for the driver. The passenger also has a backrest which is formed by another cushion layer 6 which is mounted on a top case 7. On the left and the right of the passenger and below the top case 7, motorcycle trunks 8 adjoin which are constructed such that they can be removed from the motorcycle only by using a tool. This view shows a lid 9 of the left motorcycle trunk 8 into which a recess 20 is molded as a holding grip for the passenger, next to the passenger's seat 4. In this figure, the driver's seat 1 is in the usage position and is locked by way of a locking device, which is not visible.

Figure 2:
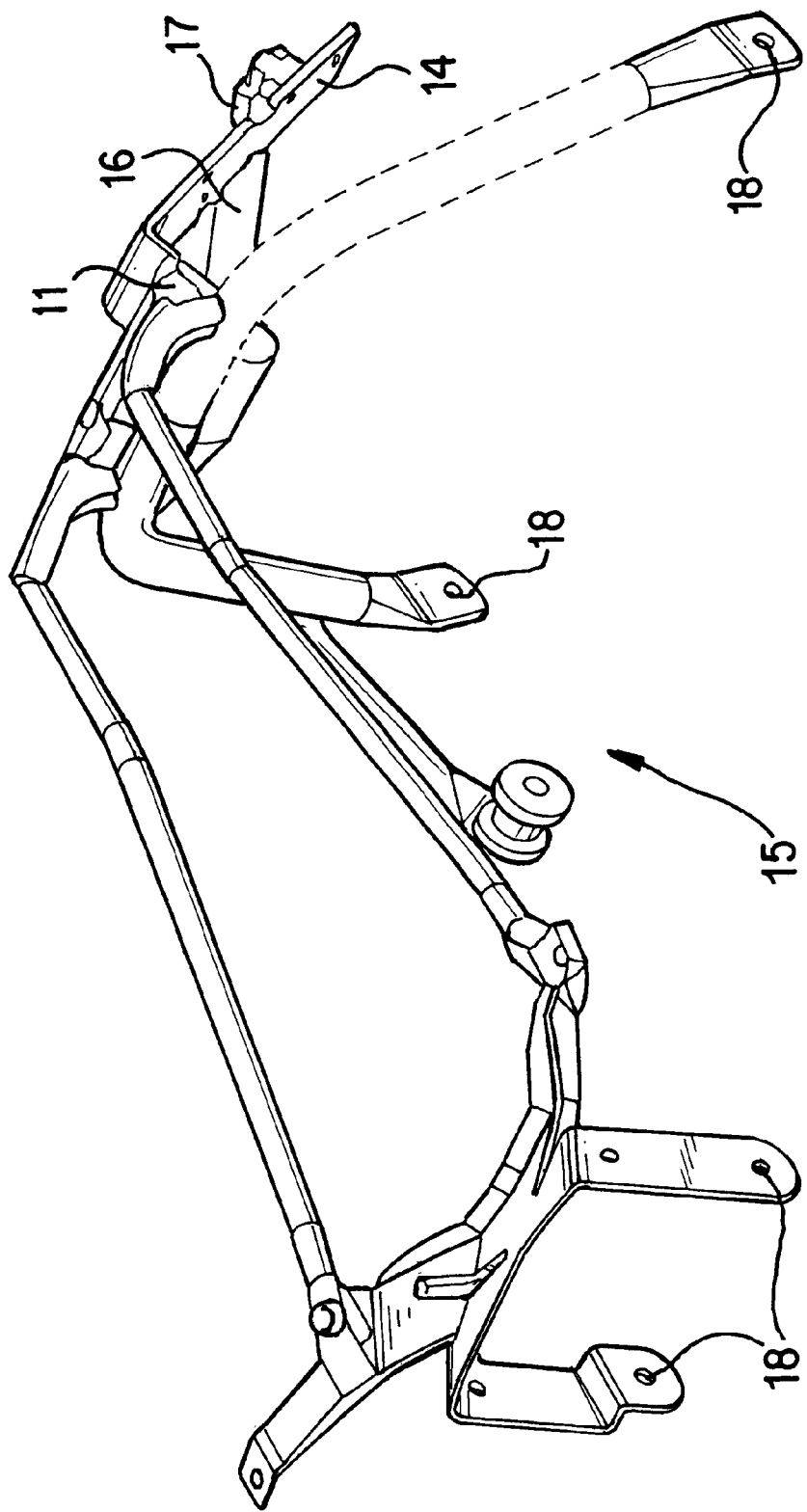
FIG. 2 is a perspective view of a holding device for an upwardly swivellable seat corresponding to the invention.

As explained with respect to the following figures, the driver's seat 1 can be swivelled upwards about a hinge axis 11 (FIG. 2). In this case, viewed in the driving direction, the hinge axis 11 is situated below the driver's seat 1 essentially in its forward area on a holding device which connects the driver's seat 1 with the motorcycle.

Figure 3:
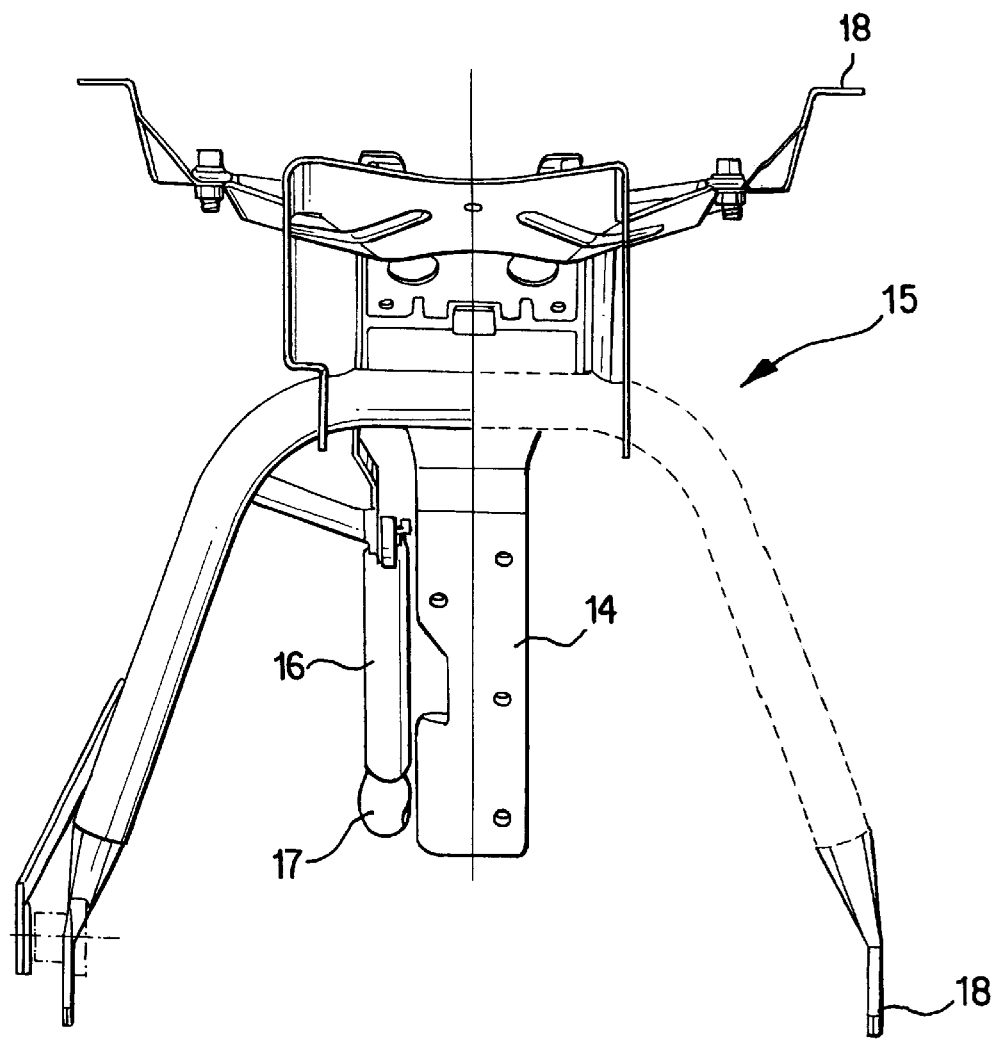
FIG. 3 is a plan view of the holding device of FIG. 2 with additional subsidiary constructional lines not essential to the invention.
Figure 4:
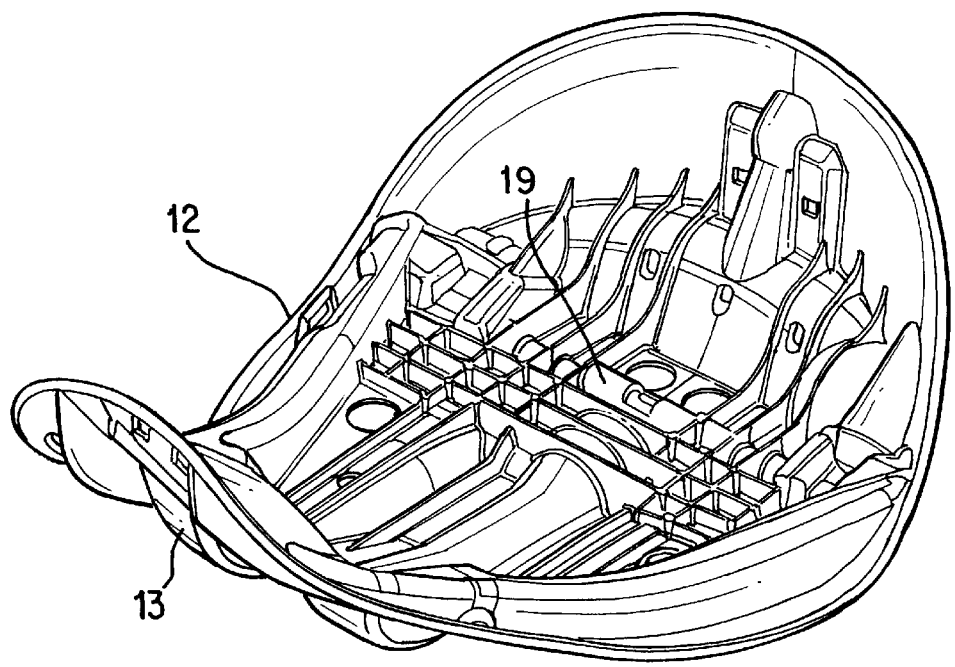
FIG. 4 is a perspective view of a seat bucket for an upwardly swivellable seat according to the invention.

This holding device is illustrated in FIGS. 2 and 3. The driver's seat, which is not shown in these figures, consists of the seat cushion 2 and the seat bucket 12 (FIG. 4). It is fixedly connected on an underneath side 13 of the seat bucket 12 by way of a hinge flange 14 with the holding device constructed as a holding bridge 15. The hinge flange 14 is swivellable by way of the hinge axis 11 mounted on the holding bridge 15. A gas pressure spring 16 is also swivellably mounted on the holding bridge 15 and is connected with its free end 17 with the seat bucket 12. In this case, the gas pressure spring 16 and the seat bucket 12 can interact such that the swivelling of the driver's seat 1 in conjunction with the gas pressure spring 16 operates as an over-dead-center system. This means that the connection between the gas pressure spring 16, the hinge flange 14, the holding bridge 15 and the seat bucket 12 is designed such that, in its usage position as well as in its swivelled-up position, the driver's seat takes up a stable balanced position.

For the motorcycle-fixed mounting the holding bridge 15 has several fastening bores 18 for forming frictionally locking and/or form-locking connections with other components of the motorcycle.

Figure 5:
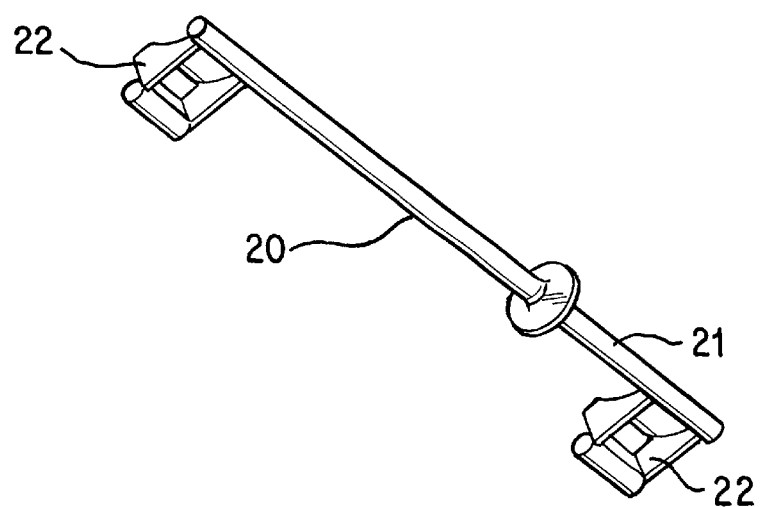
FIG. 5 is a perspective view of the seat bucket as part of a height adjusting device.

FIG. 4 is a perspective view of the seat bucket 12. The driver's seat cushion 2 is removed and a hub-type recess 19 in the seat bucket 12 is therefore visible. The latter is designed such that, viewed from below, an adjusting element 20 (FIG. 5) can be snapped in which has an axis of rotation 21 and can be rotated about this axis of rotation. On the left and on the right, this adjusting element 20 has respective projections 22. As the result of the swivelling of the adjusting element 20 about the axis of rotation, these projections 22 can be brought into two different end positions. In one end position, the seat bucket 12 is supported by way of the axis of rotation 21 on an adjusting element support 30 which is mounted on the rear frame of the motorcycle. In the other end position, the seat bucket 12 is supported by way of the projections 22 of the axis of rotation on the adjusting element support 30. As a result, in its rear area, the seat bucket 12 can take up two positions which essentially differ in their height with respect to the motorcycle rear frame. Thus, by swivelling the adjusting element 20 between its two end positions, the height of the driver's seat can be adjusted.

Figure 6:
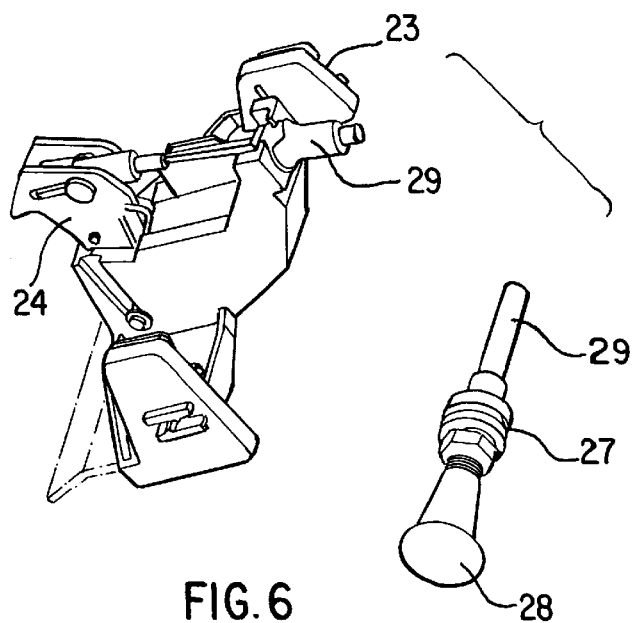
FIG. 6 is a perspective view of a locking device for the seat bucket with an operating device for an unlocking.

In its usage position illustrated in FIG. 1, the driver's seat is fixed on the motorcycle by means of a locking device (FIG. 6). For this purpose, the locking device 23 has, among other things, a locking hook 24 which automatically reaches around one holding bow 25 or 26 respectively, depending on the respective end position of the adjusting element 20. The holding bows 25, 26 are mounted on the seat bucket 12 (FIG. 7).

FIG. 6 shows the locking device 23. By way of an operating device 27, the locking hook 24 is moved for releasing the respective holding bow 25 or 26. The operating device 27 consists of an operating element 28 which is connected with the locking hook 24 by way of a Bowden cable 29. As the result of the Bowden cable connection between the operating element 28 and the locking hook 24, the operating device 27 can be housed anywhere on the motorcycle for advantageous gripping by the driver. For example, in FIG. 1, it can be housed invisibly in the motorcycle trunk 8, which is why the operating device 27 does not have to be designed to be lockable because the motorcycle trunk 8 has a locking system. Viewed in the driving direction, the locking device 23 is mounted on the motor cycle essentially below the rearward area of the driver's seat 1.

Figure 7:
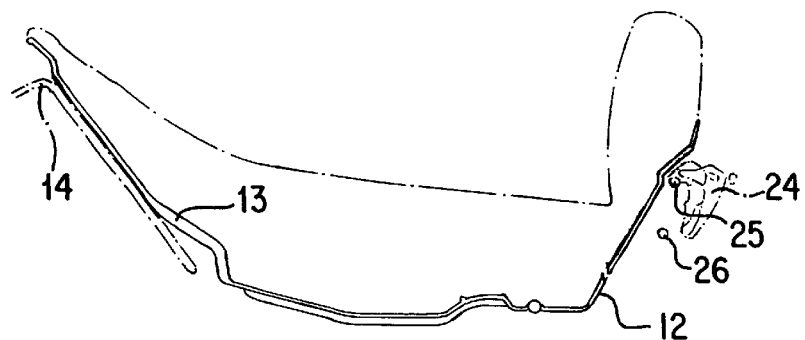
FIG. 7 is a partial sectional view of the upwardly swivellable seat with subsidiary constructional lines not essential to the invention.

FIG. 7 illustrates the locking hook 24 locked in the holding bow 25 which then engages with the locking hook 24 when the adjusting element 20 is in its one end position in which the seat bucket 12 is supported by way of the axis of rotation 21 on the motorcycle rear frame. This is the lower sitting position for the driver on the driver's seat. If the adjusting element 20 is swivelled into its other end position about the axis of rotation, the seat bucket 12 is supported by way of the axis of rotation 21 and the projections 22 on the motorcycle rear frame. The sitting position for the driver on the driver's seat is therefore higher and the locking hook 24 locks the driver's seat 1 by way of the holding bow 26 which is mounted below the holding bow 25 on the seat bucket 12.

Figure 8:
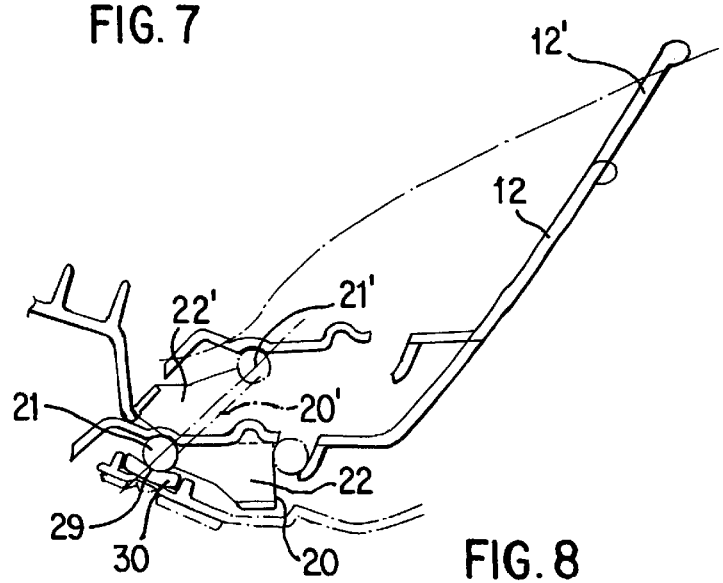
FIG. 8 is another partial sectional view of the upwardly swivellable seat in the area of the height adjusting device, also with subsidiary constructional lines not essential to the invention.

FIG. 8 shows the adjusting element 20, 20' in its one and in its other end position. Likewise, the parts of the seat bucket 12, 12' are shown in the lower and in the higher sitting position for the driver. The adjusting element 20, 20' is always supported at the same supporting point 29 on the motorcycle rear frame, on which an elastic adjusting element support 30 is mounted. In its one end position, the swivellable adjusting element 20 with its projections 22 is swivelled toward the rear so that the axis of rotation 21 of the adjusting element 20 is situated at the supporting point 29. The seat bucket 12 (and thus the driver's seat 1) thereby take up the lower sitting position for the driver. The higher sitting position for the driver is created when the adjusting element 20' is in its other end position. In this end position, the projections 22' of the adjusting element 20' are swivelled toward the front about the axis of rotation 21' and the adjusting element 20' is supported at the supporting point 29 with the projections 22'. This results in a higher position of the seat bucket 12'.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motorcycle having a driver seat arrangement including at least one seat bucket that forms a seat with a seat cushion mounted thereon, which seat is mounted on the motorcycles, can be swivelled upwardly up by way of a hinge, and can be fixed in a usage position by means of a locking device, wherein:

the upwardly swivellable seat is fastened on a holding device which in turn is mounted to the motorcycle body, and which also provides the hinge; and the holding device includes a gas pressure spring which holds the seat in a swivelled-up position.

2. Motorcycle according to claim 1, wherein:

the seat arrangement comprises a driver seat and a passenger seat; and the driver seat is swivellable upwardly by way of the hinge, about a hinge axis which, viewed in the driving direction, is mounted in a forward area below the seat on the holding device.

3. Motorcycle according to claim 1, wherein viewed in a driving direction of the motorcycle, the locking device is fixedly mounted on the vehicle below a rearward area of the seat.

4. Motorcycle according to claim 1, wherein the seat arrangement is provided with a seat height adjusting device which comprises an adjusting element mounted on the seat, by means of which adjusting element a varying distance can be set between the seat bucket and an adjusting element support mounted on a motorcycle rear frame, in the usage position of the seat.

5. Motorcycle according to claim 4, wherein:
   the seat adjusting element has at least two different usage positions defined by at least two different distances between the seat and the motorcycle rear frame;
   one holding bow respectively is mounted on the seat for each sitting position, for engagement of a locking hook of the locking device.

6. Motorcycle according to claim 1, wherein the locking device includes an operating device for unlocking the locking device; and
   the locking device and the operating device are connected with one another by a Bowden cable.

7. Motorcycle according to claim 1, wherein the operating device is housed in a motorcycle trunk.

8. A seat arrangement for a motorcycle, comprising:
   a holding bridge which is mounted on said motorcycle;
   at least one seat mounted on said holding bridge;
   a hinge included in said holding bridge, by which the at least one seat is swivellable upwardly from at least one usage position;
   a locking device which is operable to lock said seat in said usage at least one usage position; and
   a gas pressure spring coupled to said seat and said holding bridge, which gas pressure spring is operable to hold the seat in a swivelled up position.

9. A seat arrangement for a motorcycle according to claim 8, wherein said hinge swivels said seat about a hinge axis which is disposed in a forward area below the seat on the holding device.

10. A seat arrangement for a motorcycle according to claim 9, further comprising a seat height adjusting element for establishing first and second usage positions of said seat, defined by first and second vertical distances between said seat and a rear frame of said motorcycle.

11. A seat arrangement for a motorcycle according to claim 8, wherein said seat is swivellable upwardly via said hinge into an upwardly stowed position in which said seat is in a stable balanced position.

12. A seat arrangement for a motorcycle according to claim 11, wherein said gas pressure spring holds said seat in said upwardly stowed position and operates as an over-dead-center system.

13. A seat arrangement for a motorcycle, comprising:
   a holding bridge which is mounted on said motorcycle;
   at least one seat mounted on said holding bridge;
   a hinge included in said holding bridge, by which the at least one seat is swivellable upwardly from a usage position; and
   a seat height adjusting element for establishing first and second usage positions of said seat, defined by first and second vertical distances between said seat and a rear frame of said motorcycle.

14. A seat arrangement for a motorcycle according to claim 13, wherein said hinge swivels said seat about a hinge axis which is disposed in a forward area below the seat on the holding device.

15. A seat arrangement for a motorcycle according to claim 13, wherein said seat is swivellable upwardly via said hinge into an upwardly stowed position in which said seat is in a stable balanced position.

16. A seat arrangement for a motorcycle according to claim 15, wherein a gas pressure spring holds said seat in said upwardly stowed position and operates as an over-dead-center system.

* * * * *